United States Patent
Srivastava et al.

(10) Patent No.: US 10,614,062 B2
(45) Date of Patent: Apr. 7, 2020

(54) DATA MODEL EXTENSION GENERATION

(71) Applicant: SAP SE, Walldorf (DE)

(72) Inventors: Garima Srivastava, Bangalore (IN); Yeshwant More, Bangalore (IN); Sakti Prasada Mishra, Bangalore (IN)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 15/615,915

(22) Filed: Jun. 7, 2017

(65) Prior Publication Data

US 2018/0357273 A1    Dec. 13, 2018

(51) Int. Cl.
*G06F 16/00* (2019.01)
*G06F 16/242* (2019.01)
*G06F 16/28* (2019.01)
*G06F 16/178* (2019.01)

(52) U.S. Cl.
CPC ...... *G06F 16/2448* (2019.01); *G06F 16/1794* (2019.01); *G06F 16/2445* (2019.01); *G06F 16/289* (2019.01)

(58) Field of Classification Search
None
See application file for complete search history.

(56) References Cited

U.S. PATENT DOCUMENTS

| | | | |
|---|---|---|---|
| 5,603,025 A * | 2/1997 | Tabb | G06F 16/94 |
| 6,662,199 B1 * | 12/2003 | Flight | G06Q 10/06 |
| | | | 707/694 |
| 7,882,103 B2 * | 2/2011 | Brobst | G06F 16/00 |
| | | | 707/717 |
| 8,849,751 B2 * | 9/2014 | Weissenberger | G06F 16/178 |
| | | | 707/610 |
| 10,104,007 B1 * | 10/2018 | Van Rensburg | H04L 47/70 |
| 2012/0131062 A1 * | 5/2012 | Kaisermayr | G06Q 10/10 |
| | | | 707/803 |
| 2014/0006342 A1 * | 1/2014 | Love | G06F 16/23 |
| | | | 707/609 |
| 2014/0280334 A1 * | 9/2014 | LeBlanc | G06F 21/6227 |
| | | | 707/770 |
| 2016/0055222 A1 * | 2/2016 | Sarferaz | G06F 16/28 |
| | | | 707/603 |
| 2016/0364445 A1 * | 12/2016 | Golec | G06F 16/2445 |
| 2016/0368378 A1 * | 12/2016 | Berenbaum | H04L 67/12 |
| 2017/0060878 A1 * | 3/2017 | Demant | G06F 16/211 |
| 2018/0182049 A1 * | 6/2018 | Oberle | G06Q 50/18 |

* cited by examiner

*Primary Examiner* — Bai D Vu
(74) *Attorney, Agent, or Firm* — Buckley, Maschoff & Talwalkar LLC

(57) ABSTRACT

Provided are devices and methods for extending database views of a predefined data model to include custom industry fields, behind a switch. In one example, the method includes receiving a database table including common fields that are common to a plurality of industries and custom fields that are customized for at least one industry, generating a database view of the database table, the database view including the common fields transformed into a format represented by a predefined data model, executing an extension program that generates a data object in which the custom fields are transformed into the format represented by the predefined data model, and combining the data object including the custom fields having the transformed format with the database view including the common fields having the transformed format to generate an extended database view.

17 Claims, 6 Drawing Sheets

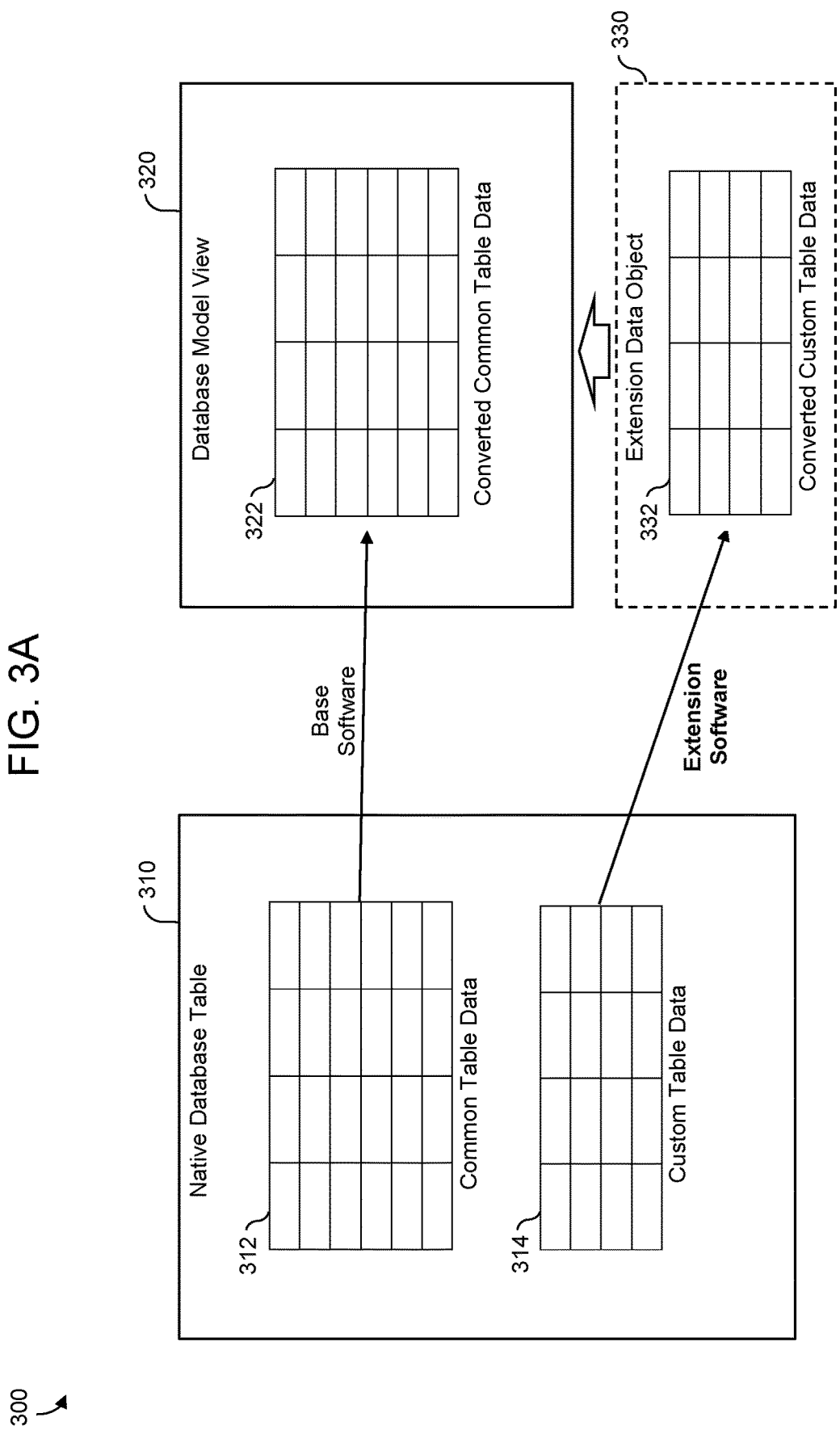

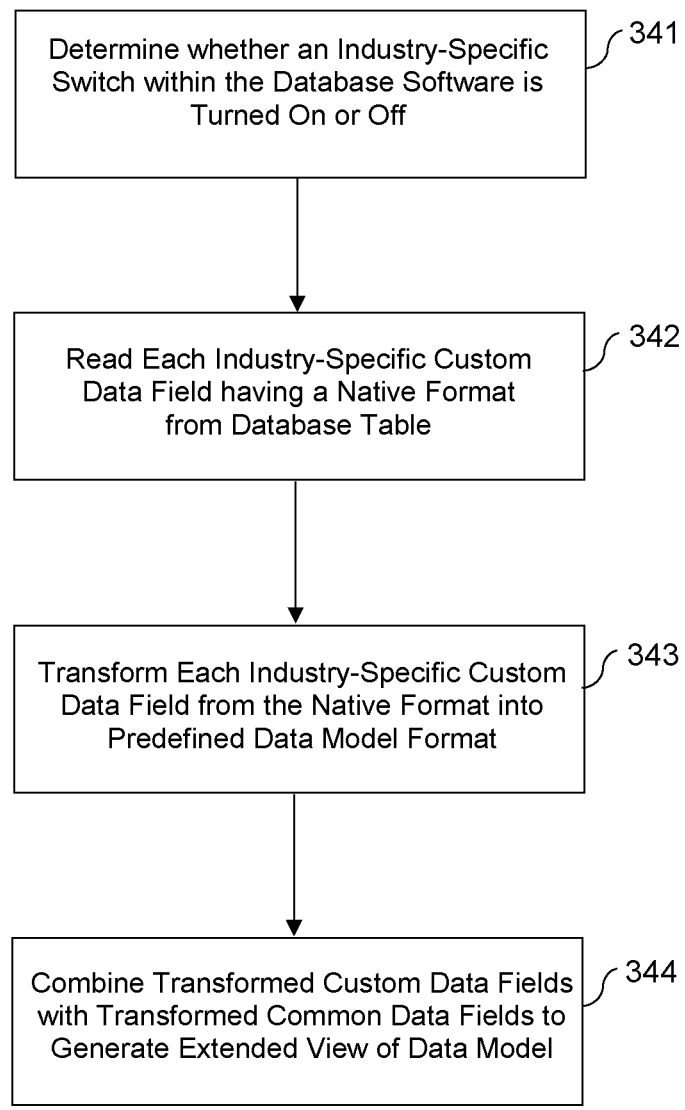

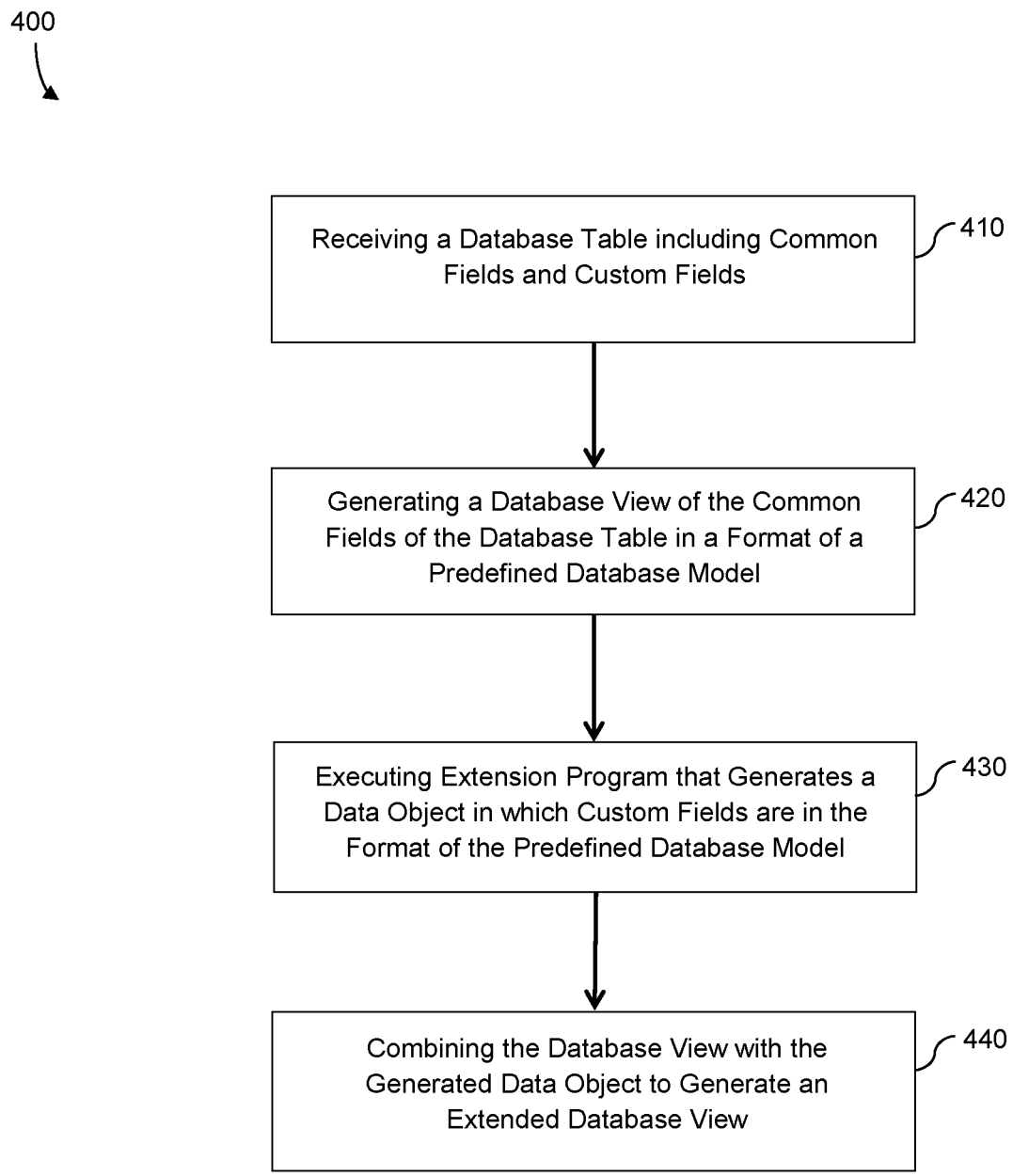

DATA MODEL EXTENSION GENERATION

BACKGROUND

A data model represents a framework of relationships of a database. Data models are the foundation of software development when software accesses the database. For example, a data model can provide a logical structure for the database and define how data is connected to each other and how it is processed and stored within the system, enabling different applications and other software to share the same view of the data. Professional data modeling tools provide a means to generate Structured Query Language (SQL) from a modeled diagram although some developers still prefer writing SQL directly. A virtual data model was introduced a few years ago and typically sits on top of a suite of database tables that use native data views for real-time operational reporting.

Next-generation database business suites consist of several modules and combine data from different modules to provide strategies for supporting and assisting business development. Rather than require all industries to use a single database view, next-generation database suites offer unique end-to-end business processes in a plurality of respective industries. Each industry may be provided with a unique set of business processes which work on top of a core solution of processes that the database provides for all industries. Companies using this database software can expand into new industries and continue to use the same database software by simply activating new industries to the existing landscape. In addition to the data and functions of the software itself, clients also get the best practices which are often developed by leading businesses in each industry.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3A is a diagram illustrating a process of extending a data model view based on a predefined data model format in accordance with an example embodiment.

FIG. 3B is a diagram illustrating a flowchart of the extension program performing a data conversion for custom data included in a native database table in accordance with an example embodiment.

FIG. 4 is a diagram illustrating a method for extending a data model view in accordance with an example embodiment.

Figure 1:
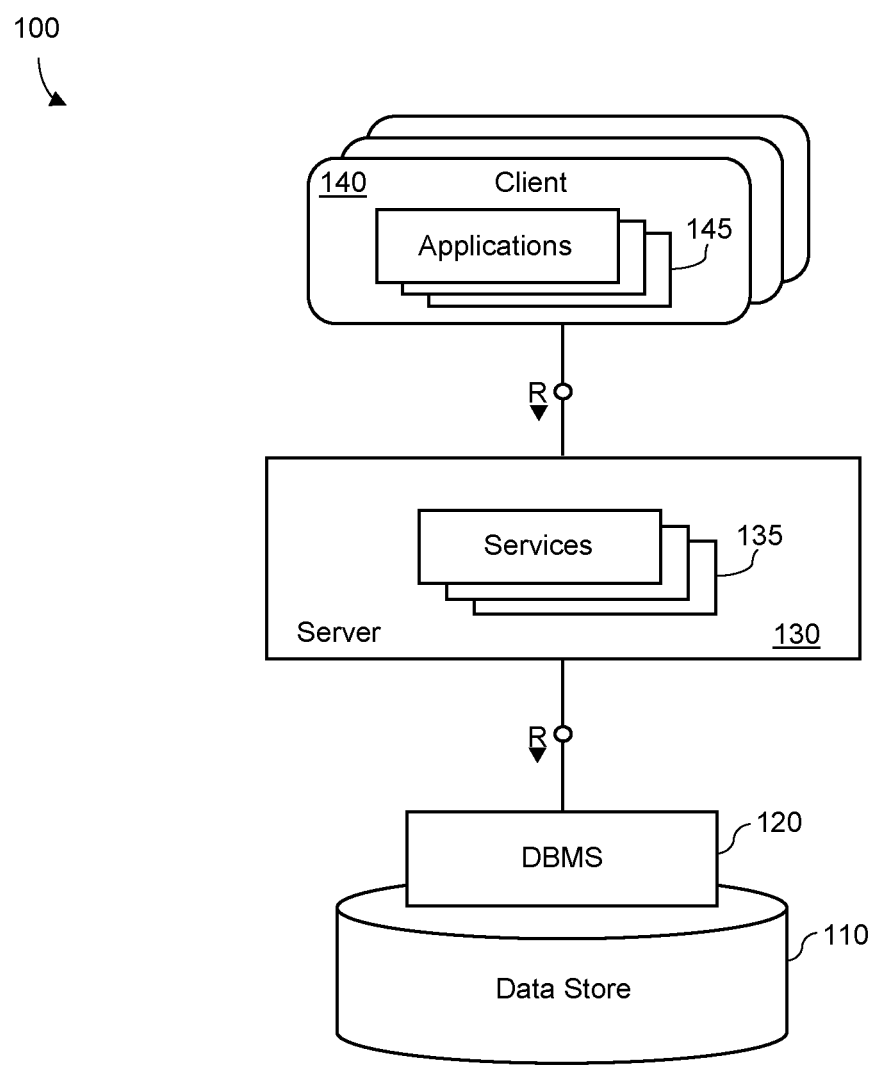
FIG. 1 is a diagram illustrating a database management architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Next-generation database software for businesses include design principles that simplify and improve the client experience. This next-generation database software incorporates a common core of software functions and fields of data that are common across all industries. In addition, the software also incorporates unique industry specific software functions and fields of data, which can be turned on and off based on a client need. The database software delivers massive simplifications (customer adoption, data models, improved user experience, decision making, business processes, etc.) and innovations (Internet of Things, big data, business networks, mobile-first, etc.) to help businesses run easier in a digital economy. The software may include an aggregation of different industries that each have a unique set of business processes which work on top of a core of common business processes and data. Examples of particular industries include, but are not limited to, healthcare, oil and gas, mining, professional services, utilities, public works, and the like.

Particular industries can be activated through the software on a client side by switching on industry specific data functions and data fields. For example, the segregation and restriction of industries may be performed by a switch framework that includes a switch for each respective industry. In some cases, the switch framework may only allow one industry to be activated in a customer system, at a time. The switch framework may simplify a database system landscape by adopting one or more industry solutions in a standard system. For example, the switch framework may enable a client to externally control a visibility of database development objects or their components by means of the switches. By using the switch framework, all of the industry solutions and a restricted list of objects are delivered in an inactive state to the system. As a result, a customer no longer needs to install a separate industry database software explicitly but instead activate a particular industry whenever required by the client.

The switch framework may include various main components in a hierarchy including a business function set, a business function, and a switch. Within the switch framework, a business function set corresponds to an industry database software (i.e., a specific industry) and includes a group of business functions. A business function is a self-contained function from a business perspective and may include a set of switches. Meanwhile, a switch is a database object that controls the visibility of other objects. Switches can be controlled manually or automatically by an application or other software.

Data models are a cornerstone of application development. A data model provides a standardized method for defining and formatting database contents consistently across systems, enabling different applications (and different systems) to share the same data. In doing so, a data model can reduce development costs, speed time to market, and improve quality and performance. Recently, a new data modeling infrastructure known as core data services (CDS) was introduced. A CDS data model may be defined and consumed on the database rather than on an application server. CDS also offer capabilities beyond traditional data modeling tools, including support for conceptual modeling and relationship definitions, built-in functions, and extensions. Technically, CDS is an enhancement of structured query language (SQL) model which provides a data definition language (DDL) for defining semantically rich database tables/views (CDS entities) and user-defined types in the database. Some of the enhancements provided by the CDS data model include expressions used for calculations and queries in the data model, data associations on a conceptual level, replacing joins with simple path expressions in queries, and annotations to enrich the data models with additional (domain specific) metadata.

CDS offers a SQL based layer that extends the SQL-92 standard with features that bridge and unify the traditional on-line transaction processing (OLTP) and on-line analytical processing (OLAP) models of data definition, data query, and data manipulation. Supported natively, the data models may be expressed in a DDL and may be defined as CDS views, which can be used in database programs via Open SQL statements to enable access to data stored in the database. CDS views provide a range of advantages for businesses and developers, including efficiency, support for annotations, support for conceptual annotations, and extensibility. Data models in CDS may serve as a central definition that can be used in many different domains, such as transactional and analytical applications, to interact with data in the database in a unified way. In addition, CDS data models go beyond the capabilities of a traditional data dictionary format or data definition language. For example, in CDS, it is possible to define views that aggregate and analyze data in a layered fashion, starting with basic views and then adding more powerful views that combine basic views. Another benefit is the support for special operators such as UNION, which enables the combination of multiple select statements to return only one result set.

Industry specific components of the database software include customized data fields (referred to as appends) and business processes which make the database easier and more efficient to use for clients of that particular industry. However, at present, industry specific components are not compatible with CDS as these CDS extend views are built on database tables/views where industry fields are behind a switch. Furthermore, attempting to access these customized fields of a particular industry with CDS views will cause a syntax error. In addition, as long as CDS views are not switchable, there is no way for clients to use customized industry data fields and business process in any CDS views.

The example embodiments provide an extension software (e.g., program) that can extend a CDS view to include not only the core common fields from a database table (e.g., a native database table) that are provided for all industries, but also customized fields from the database table which are specific to a particular industry (or subset of industries). The customized fields can be read and converted into a format of a data model architecture such as CDS, or the like, by the extension software. The conversion program may convert various industry-specific data and functions of a database table into a format of a predefined data model such as CDS. As will be understood by one in the art, there is a number of modifications which must occur to convert a database table from a native format such as a native data dictionary (DDIC) format or data definition language (DDL) into a data model such as CDS. For example, the conversion may include converting a piece of data from a first format into strings, numbers, alphanumeric data, binary data, blob data, clob data, date values, decimals, doubling the data, truncating the data, etc.

The extension program can extend the data model views behind a switch thereby ensuring that the extended views are only generated when a particular industry is switched on. The problem with performing these extensions manually is that a customer can edit the extensions which would increase the maintenance effort in case of any inconsistencies reported by the customer between an extended field delivered by the database provider or a customer specific field. Therefore, to ease the process, the data model extensions may be generated automatically within a standard namespace and the extension program can be integrated to a database during a routine system upgrade. As a result, the incorporation of the extension program can be hidden from a client and controlled by the database provider.

As described herein, a database view (e.g., a CDS view) is an object that may not be persistent. The view may be defined as a projection of other objects. Software may enable a client to create a database view having a format of a predefined data model as a design-time file in a repository or other storage system. For example, a client may define a CDS view, which may be stored as a design-time file in the repository. Stored files can be read by applications that are developed by the client. In addition, all stored files including view definitions can be transported to other systems via transport requests. When an application refers to a design-time version of a database view from the storage rather than a runtime version in a catalog, for example, by using the explicit path to the storage file (with suffix), any changes to the stored version of the file may become visible as soon as they are committed to the storage. As a result, there is no need to wait for the storage to activate a runtime version of the view.

FIG. 1 illustrates a database management architecture 100 in accordance with an example embodiment. It should be appreciated that the embodiments are not limited to architecture 100 or to a database architecture, and that FIG. 1 is shown for purposes of example. Referring to FIG. 1, the architecture 100 includes a data store 110, a database management system (DBMS) 120, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may include server-side executable program code (e.g., compiled code, scripts, etc.) which provide functionality to applications 145 by providing user interfaces to clients 140, receiving requests from applications 145 (e.g., drag-and-drop operations, database view requests, etc.), retrieving data from data store 110 based on the requests, processing the data received from data store 110, and providing the processed data to applications 145.

In one example, a service 135 may include an extension program described according to various embodiments. The extension program may generate extended views of table data stored in the data store 110 according to a predefined data model. The extended database views may be passed to and consumed by applications 145. For example, an application 145 may transmit a request for a database view having a predefined data model format based on an input to one of the services 135. The service 135 may generate an SQL script based on the request and forward the SQL script to DBMS 120 in order to extract, retrieve, or otherwise obtain data from underlying data tables in data store 110. DBMS 120 executes the SQL script to return a result set based on data of data store 110. In response, the service 135 may generate an extended view of the result set including both common data fields and customized data fields having the predefined data model format, and the application 145 consumes the extended view and/or creates a report/visualization based on the extended view. As another example, the extended view program may be executed by the DBMS 120, an application 145, or the data store 110 directly, instead of a service 1 In the example of FIG. 1, the services 135 executing on server 130 may communicate with DBMS 120 using database management interfaces such as, but not limited to, Open Database Connectivity (ODBC) and Java Database Connectivity (JDBC) interfaces. Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the data of data store 110. The application services can be used to expose the predefined data model, with its tables, views and database procedures, to clients 140. In addition to exposing the predefine data model, server 130 may host system services such as a search service and the like.

Data store 110 may include a query-responsive data source or sources that are or become known, including but not limited to a SQL relational database management system. Data store 110 may include a relational database, a multi-dimensional database, an Extensible Markup Language (XML) document, or any other data storage system storing structured and/or unstructured data. The data of data store 110 may be distributed among multiple relational databases, dimensional databases, and/or other data sources. Embodiments are not limited to any number or types of data sources. In some embodiments, the data of data store 110 may include one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated (or partitioned) from one another.

The database management architecture 100 may include metadata defining objects which are mapped to logical entities of data store 110. The metadata be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may include user interfaces that are suited for reporting, data analysis, and/or any other functions based on the data of data store 110. Presentation of a user interface as described herein may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols. One or more of clients 140 may also or alternatively present user interfaces by executing a stand-alone executable file (e.g., an .exe file) or code (e.g., a JAVA applet) within a virtual machine.

Figure 2:
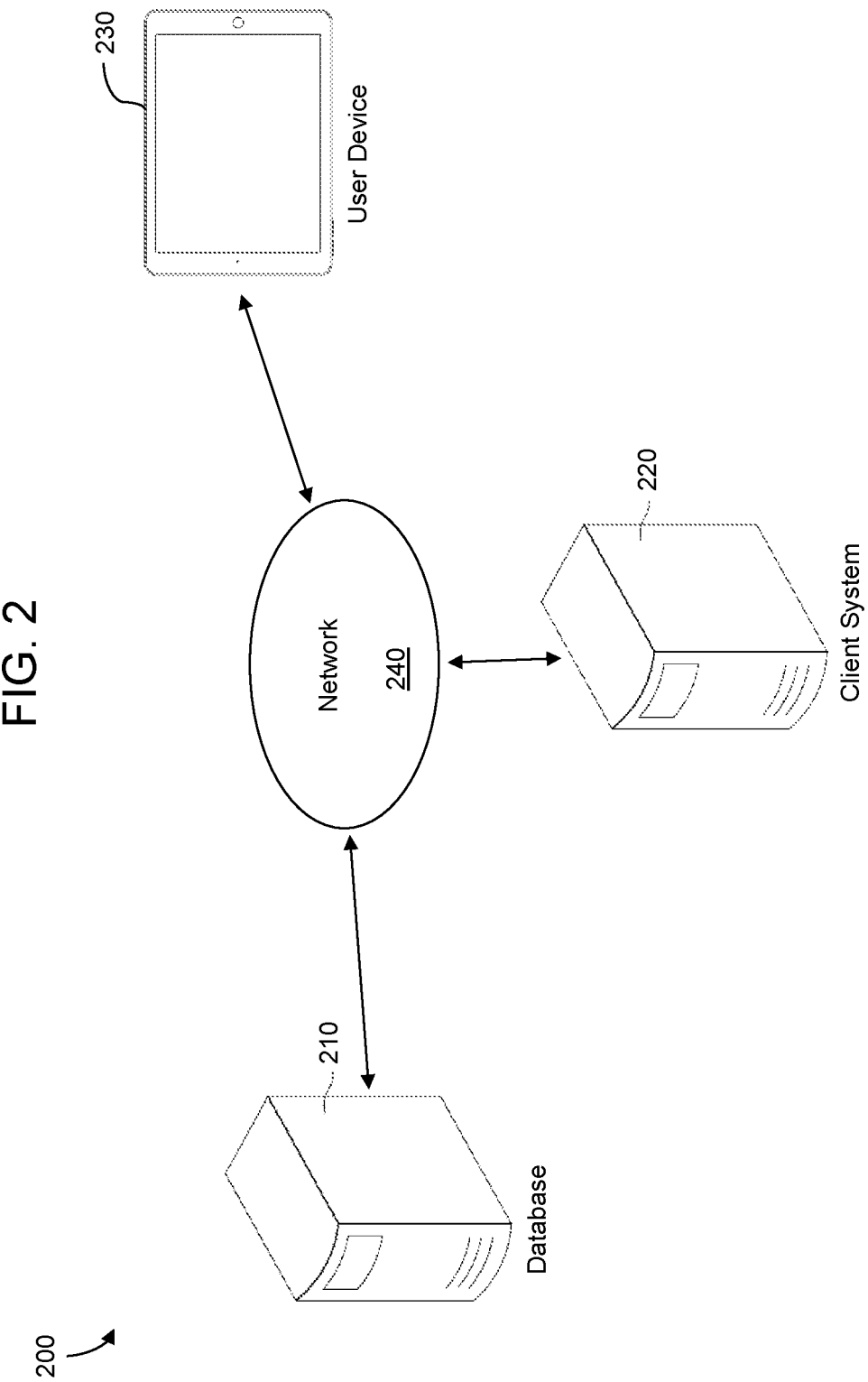
FIG. 2 is a diagram illustrating a system for accessing data from a database in accordance with an example embodiment.

FIG. 2 illustrates a system 200 for accessing data from a database in accordance with an example embodiment. In this example, the system 200 includes a database 210 which may include the architecture 100 shown in FIG. 1, or another type of architecture. The system 200 also includes a client system 220 and a user device 230. The database 210, the client system 220, and the user device 230 are connected to each other via a network 240. The user device 230 may be a personal computing device such as a laptop, a tablet, a mobile phone, an appliance, a computer, and the like. The client system 220 may include a server, a cloud computing system, a computing system, and the like. Both the client system 220 and the user device 230 may execute applications which access data from the database 210. In addition, the database 210 may include local applications executing thereon which also access data from the database 210.

In one example, the database 210 corresponds to a database provider for both client system 220 and user device 230 (which may be a user associated with the client system 220). In this example, the user device 230 may access the database 210 through the client system 220. For example, the database 210 may host big data, business data, enterprise resource planning (ERP) data, human resources data, and the like, which are used by businesses on a regular basis. Each business or client may have their own dedicated partition within the database 210. CDS simplifies and harmonizes the way a client defines and consumes their data models, regardless of the consumption technology.

The database software may provide a core group of data and functions to all clients. In addition, the database software may provide an industry specific group of data and functions for an industry or subset of industries associated with the client system 220. For example, if the client system 220 is associated with oil and gas, the database 210 may provide industry specific functions and data for use in the fields of oil and gas. The database software may be installed on the database 210, the client system 220, the user device 230, and/or a combination thereof. When data is requested by the client system 220 or the user device 230, the database 210 may convert the data into a predefined data model that defines and formats database contents consistently across systems, enabling different applications and systems to access and to share the same data in the same format.

The database software may be provided in two variants including a standard variant used across all clients and a unique industry variant for a particular industry or subset of industries, such as oil and gas, healthcare, retail, etc., used by only specifically selected clients. This industry usage is positioned behind a switch that may be implemented by a switch framework. The database software may be provided as a standard product (including all industry variants) but it may also include switches for selectively turning on a particular industry variant for a particularly client. For example, an oil and gas client can activate the switch for oil and gas, and in response, the specific functions for oil and gas will execute in the client's system.

FIG. 3A illustrates a process 300 of extending a view of a data model according to a predefined data model format in accordance with an example embodiment. Referring to FIG. 3, a database table 310 which may initially be in a native data format includes both common data 312 that is common across all industries and custom data 314 that is customized and industry specific, and referred to as appends. When an industry variant (e.g., oil and gas functionality) is switched on, the custom data fields 314 in the database table 310 which are specific to that particular industry become viewable. These custom fields enhance the use of the database by facilitating easier functionality and data storage specific to the particular industry. When the industry variant is switched off, however, the custom data fields 314 are not visible.

A database model view 320 may be generated from the native table 310. The database model view 320 can be a standardized data format for applications that access the database. However, current database software is limited in that only common data 312 from the native database table 310 across all industries can be converted into a format of the database model. In this example, the common data 312 from database table 310 is transformed into converted common data 322 included in the database model view 320. According to various embodiments, an extension program may be used to extend the database model view 320. For example, the extension program may regenerate or otherwise add custom table data 314 to the database model view 320 after transforming the custom table data 314 into converted custom data 332. In this example, the extension program generates extension 330 including converted custom data 332 which may be a data object that is created in or added to an existing database model view 320. In other words, the extension program adds to the table included in the database model view 320 by adding fields for specific industry custom fields 314 from the lower database table 310. Furthermore, the extension may be performed behind an industry specific switch thus making the converted custom data 332 available upon activation of the switch only (and not all the time).

In this example, the database model view 320 may be extended to include the converted industry specific fields 332 from the industry specific table 314 of the native database table 310. The extension may have a switch assigned to it that corresponds to the industry switch. The switch allows the system to understand only to create the extension 330 when the industry specific switch has been activated. In some embodiments, the extension program may be installed as part of a general software update for the database and/or the client. As a result, the client may be unaware of the extension program they are just aware of the data model view including custom data fields. By adding the extension program behind the industry switch, control of the extension program can be maintained by the software.

FIG. 3B illustrates a flowchart of the extension program performing a data conversion 340 for custom data included in a native database table. For example, the data conversion 340 may correspond to the conversion of custom data 314 to transformed custom data 332 shown in the example of FIG. 3A. Referring to FIG. 3B, an industry specific switch may be switched on for a database software suite. Accordingly, when a request is received for a database table corresponding to the industry, the database may return a data model view of the database table in which the data model is extended to include both common data fields and custom data fields converted into the data model format. In 341, the extension program may determine whether an industry switch has been turned on or off, in response to receiving a request for a database table associated with the industry. The extension program may be part of a database software suite including a switch framework in which particular industries may be turned on or off based on a particular client.

In 342, in response to detecting that the industry switch is turned on, the extension program may read each industry-specific custom data field from the requested database table where the custom data fields have a native format of the database. In 343, the extension program may transform a format of each custom data field into a format a predefined data model corresponding to the database software suite. For example, the extension program may convert the format of each custom data field to a CDS format, or the like. In 344, the extension program may combine the transformed custom data fields with previously transformed common data fields from the requested database table, and generate a new extended view of the database table in the predefined data model including both the common data and the custom data. Furthermore, the extension program may store the extended view of the database table, pass the extended view of the database table to an application or program, or the like.

FIG. 4 illustrates a method 400 for extending a data model view in accordance with an example embodiment. For example, the method 400 may be performed by a program executing on a database level. The database may be coupled to a server, a cloud platform, a computing system, and the like. Referring to FIG. 4, in 410, the method includes receiving a database table including common fields that are common to a plurality of industries and custom fields that are customized for at least one industry. For example, the common fields may include database fields that are standard across all industries in a database software. Meanwhile, the custom fields may be append fields that are specific to a particular industry or a subset of industries included in the database software.

In 420, the method further includes generating a database view of the database table. Here, the database view that is generated includes the common fields transformed into a format of a predefined database model. For example, the common fields may be transformed by a data model software such as CDS. However, CDS is unable to transform industry-specific fields and functions. Accordingly, the example embodiments may perform an extension of the data base view of the predefine database model. In this example, the database table may include a native data format, the database view may include the data format of the predefined database model, and the database view is generated by converting the common fields from the native data format to the format defined by the predefined database model.

According to various embodiments, in 430, the method further includes executing an extension program that generates a data object in which the custom fields of the native database table are transformed into the format of the predefined data model. Here, the extension program may extend a view of the predefined data model by transforming industry specific fields of data and functions into a format of the predefined data model such as CDS. For example, when executed, the extension program may generate the data object by obtaining values from the custom fields of the database table, transform a format of the obtained values based on the predefined data model, and store the transformed values in the data object. Furthermore, the extension program may regenerate the database view generated in 420 to include the transformed custom fields as well as the transformed common data fields. For example, in 440, the method may include combining the data object including the custom fields having the transformed format with the database view including the common fields having the transformed format to generate an extended database view, and storing the extended database view in a database.

In some embodiments, although not shown in FIG. 4, the method 400 may further include transmitting the extended database view to an executing software application which can consume both the transformed common fields and custom fields. For example, the application may execute one or more operations based on data included in at least one common field and data included in at least one custom field represented by the predefined database model included in the extended database view. In some embodiments, prior to executing the extension program in 430, the method may further include installing the extension program in a client partition of the database via a database software update. In this case, the installation of the extension program may be transparent to the client. In some embodiments, the extension program may be associated with a switch that turns the extension program on and off. For example, the switch may be included within the extension program or it may be included within the database. In this example, when the switch is turned on, the extension program may automatically generate the data object, and when the switch is turned off, the extension program may not be executed.

Figure 5:
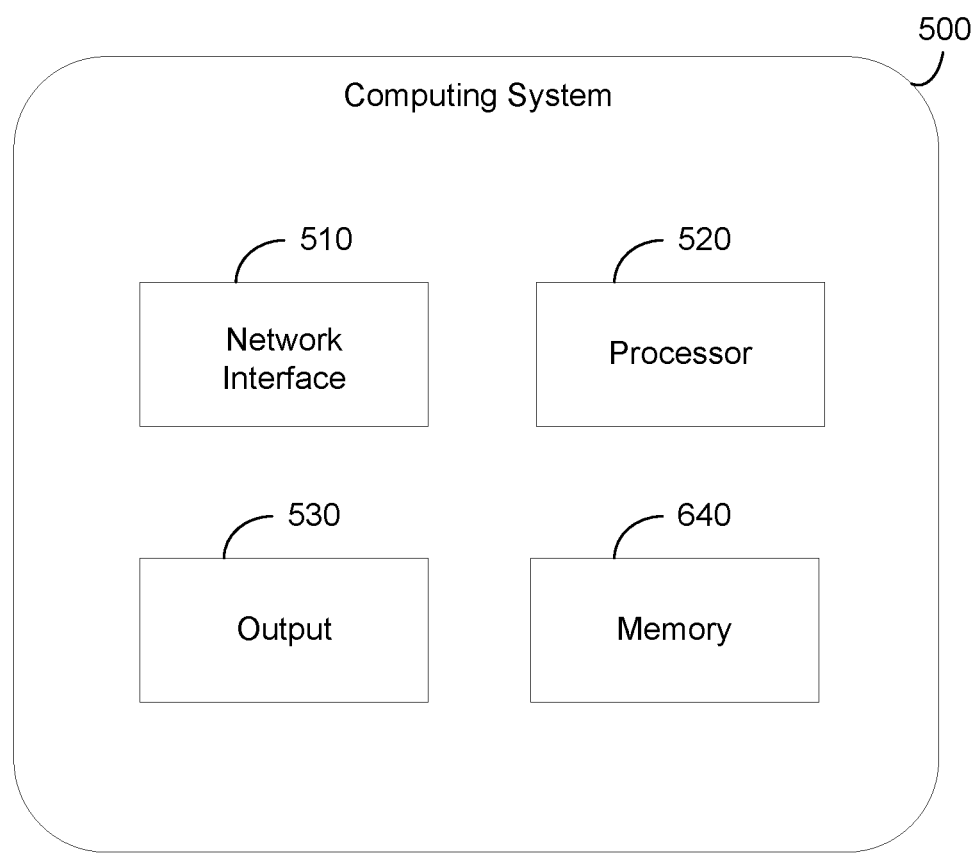
FIG. 5 is a diagram illustrating a computing system for extending a data model view in accordance with an example embodiment.

FIG. 5 illustrates a computing system 500 for extending a data model view in accordance with an example embodiment. For example, the computing system 500 may be implemented by a database, a server, a cloud platform, or another type of computing device such as a workstation or terminal. Referring to FIG. 5, the computing system 500 includes a network interface 510, a processor 520, an output 530, and a memory 540. Although not shown in FIG. 5, the computing system 500 may include other components such as a display, an input unit, a receiver/transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 500, an externally connected display, a cloud, another device, and the like. The memory 540 may be a data store or other database and is not limited to any particular storage device. For example, the memory may include data warehouse, or the like.

In this example, the network interface 510 may receive database tables from an external database. As another example, the database tables may be stored in the memory 540 and provided to the processor 520 during data retrieval operations, for example, read, write, store, and the like. According to various embodiments, the processor may receive a database table including common fields that are common to a plurality of industries of a database software and custom fields that are customized for an industry or a subset of industries included in the database software. The processor 520 may generate a database view of the database table. For example, the database view may include the common fields transformed into a format of a predefined data model such as CDS. In this example, the database table may include a native data format, the database view may include the format of the predefined data model, and the processor 520 may generate the database view by converting the common fields from the native data format to the format defined by the predefined data model. However, the database software executed by the processor 520 may not be able to convert the custom fields of the database table into the format of the predefined data model.

Accordingly, the processor 520 may receive and execute an extension program that generates a data object in which the custom fields are transformed into the format of the predefined data model. Here, the extension program may extend the view of the predefined data model to include the custom fields. For example, the network interface 510 may receive a package including the extension program via a software update of the computing system 500. Accordingly, the processor 520 may install the extension program on the computing system 500 prior to executing the extension program. The extension program may be installed within a client partition of the memory 540 or a within a standard partition of the memory 540. In addition, the extension program may combine the data object including the custom fields having the transformed format with the database view including the common fields having the transformed format to generate an extended database view. Accordingly, the transformed common fields and the transformed custom fields may be incorporated into a single table or view of the data. In this example, when executed, the extension program may cause the processor 520 to generate the data object by obtaining values from the custom fields of the database table, transform a format of the obtained values based on the predefined database model, and store the transformed values in the data object.

In some embodiment, the processor 520 may transmit the extended database view to an executing software application (local or external) which performs one or more operations based on transformed data included in at least one common field and transformed data included in at least one custom field. In some embodiments, the extension program may be associated with a switch that turns the extension program on and off. In this example, when the switch is turned on, the extension program may cause the processor 520 to automatically generate the data object, and when the switch is turned off, the extension program is not executed by the processor 520.

Although the example embodiments are described herein with reference to a CDS data model, it should be appreciated that the example embodiments are not limited thereto. CDS is merely one example of a database data model, and any database data model can be extended by the systems and methods described by the example embodiments.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a memory configured to store instructions;
   a processor coupled to the memory and configured to execute the instructions, wherein the executed instructions cause the processor to:
   receive a database table comprising common fields that are common to a plurality of industries and custom fields that are customized for at least one industry;
   generate a database view of the database table, the database view comprising values of the common fields transformed from a native format into a format of a predefined data model;
   execute an extension program that generates a data object in which transforms values of the custom fields from the native format into the format of the predefined data model; and
   combine the data object including the transformed custom fields with the database view including the transformed common fields to generate an extended database view.

2. The computing system of claim 1, wherein the executed instructions further cause the processor to transmit the extended database view to an executing software application which performs one or more operations based on transformed data included in at least one common field and transformed data included in at least one custom field.

3. The computing system of claim 1, wherein the common fields are common to all industries included in a database software and the custom fields are unique for a subset of industries included in the database software.

4. The computing system of claim 1, wherein, when executed, the extension program generates the data object by obtaining values from the custom fields of the database table, transforms a format of the obtained values based on the predefined data model, and stores the transformed values in the data object.

5. The computing system of claim 1, wherein the executed instructions further cause the processor to install the extension program in a client partition of the database via a database software update, prior to executing the extension program.

6. The computing system of claim 1, wherein the extension program is associated with a switch that turns the extension program on and off.

7. The computing system of claim 6, wherein, when the switch is turned on, the extension program automatically generates the data object, and when the switch is turned off, the extension program is not executed by the processor.

8. A method comprising:
   receiving a database table comprising common fields that are common to a plurality of industries and custom fields that are customized for at least one industry;
   generating a database view of the database table, the database view comprising values of the common fields transformed from a native format into a format of a predefined data model;
   executing an extension program that generates a data object in which transforms values of the custom fields from the native format into the format of the predefined data model; and
   combining the data object including the transformed custom fields with the database view including the transformed common fields to generate an extended database view.

9. The method of claim 8, further comprising transmitting the extended database view to an executing software application which performs one or more operations based on transformed data included in at least one common field and transformed data included in at least one custom field.

10. The method of claim 8, wherein the common fields are common to all industries included in a database software and the custom fields are unique for a subset of industries included in the database software.

11. The method of claim 8, wherein, when executed, the extension program generates the data object by obtaining values from the custom fields of the database table, transforms a format of the obtained values based on the predefined data model, and stores the transformed values in the data object.

12. The method of claim 8, further comprising installing the extension program in a client partition of the database via a database software update, prior to executing the extension program.

13. The method of claim 8, wherein the extension program is associated with a switch that turns the extension program on and off.

14. The method of claim 13, wherein, when the switch is turned on, the extension program automatically generates the data object, and when the switch is turned off, the extension program is not executed.

15. A non-transitory computer readable medium having stored therein instructions that when executed cause a computer to perform a method comprising:

receiving a database table comprising common fields that are common to a plurality of industries and custom fields that are customized for at least one industry;

generating a database view of the database table, the database view comprising values of the common fields transformed from a native format into a format of a predefined data model;

executing an extension program that generates a data object in which transforms values of the custom fields from the native format into the format of the predefined data model; and combining the data object including the transformed custom fields with the database view including the transformed common fields to generate an extended database view.

16. The non-transitory computer-readable medium of claim 15, wherein the method further comprises transmitting the extended database view to an executing software application which performs one or more operations based on transformed data included in at least one common field and transformed data included in at least one custom field.

17. The non-transitory computer-readable medium of claim 15, wherein the common fields are common to all industries included in a database software and the custom fields are unique for one industry included in the database software.

* * * * *